(12) United States Patent
Kolb et al.

(10) Patent No.: US 9,072,342 B2
(45) Date of Patent: Jul. 7, 2015

(54) PORTABLE WORK APPARATUS HAVING STRAPS

(71) Applicant: Andreas Stihl AG & Co. KG, Waiblingen (DE)

(72) Inventors: Joachim Kolb, Ludwigsburg (DE); Volker Reber, Michelbach/Bilz (DE); Alexander Maier, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 14 days.

(21) Appl. No.: 14/059,894

(22) Filed: Oct. 22, 2013

(65) Prior Publication Data

US 2014/0115835 A1    May 1, 2014

(30) Foreign Application Priority Data

Oct. 26, 2012  (DE) .......................... 10 2012 021 000

(51) Int. Cl.
  *A44B 11/00*  (2006.01)
  *A01D 34/90*  (2006.01)
  *F16B 2/00*  (2006.01)
  *B05B 7/14*  (2006.01)
  *A01G 3/053*  (2006.01)
  *A45F 3/14*  (2006.01)

(52) U.S. Cl.
  CPC ................. *A44B 11/00* (2013.01); *Y10T 24/47* (2015.01); *F16B 2/005* (2013.01); *B05B 7/1413* (2013.01); *A01G 3/053* (2013.01); *A01D 34/902* (2013.01); *A45F 2003/146* (2013.01)

(58) Field of Classification Search
  USPC ........................... 224/576, 265, 578, 581, 158
  See application file for complete search history.

(56) References Cited

U.S. PATENT DOCUMENTS

| 5,052,073 | A  | * | 10/1991 | Iida ............................... 15/327.5 |
| 5,395,052 | A  | * | 3/1995  | Schneider et al. ............ 239/154 |
| 5,503,090 | A  | * | 4/1996  | Guzan ............................ 111/7.2 |
| 5,716,131 | A  | * | 2/1998  | Breeding ...................... 366/120 |
| 6,089,477 | A  | * | 7/2000  | Dillon ........................... 239/653 |
| 6,370,729 | B2 | * | 4/2002  | Miyamoto ...................... 15/326 |
| 6,382,490 | B1 | * | 5/2002  | Divincenzo ................... 224/681 |
| 6,575,695 | B1 | * | 6/2003  | Miyamoto ..................... 415/119 |
| 6,688,538 | B2 | * | 2/2004  | Nemoto et al. ............... 239/152 |
| 6,702,167 | B2 | * | 3/2004  | Annis ............................. 224/576 |
| 6,729,558 | B1 | * | 5/2004  | Seenauth ...................... 239/152 |
| 6,857,163 | B2 | * | 2/2005  | Iida et al. ..................... 15/327.5 |
| 7,309,028 | B2 |   | 12/2007 | Langhans et al. |
| 7,543,725 | B2 | * | 6/2009  | Herzog ......................... 224/576 |
| 2002/0175222 | A1 | * | 11/2002 | Vaage ............................ 239/153 |
| 2010/0264188 | A1 | * | 10/2010 | Carlsson et al. .............. 224/576 |

FOREIGN PATENT DOCUMENTS

DE           196 16 764 A1   11/1997

* cited by examiner

*Primary Examiner* — Brian D Nash
(74) *Attorney, Agent, or Firm* — Walter Ottesen P.A.

(57) ABSTRACT

A portable work apparatus has a main unit and a work tool. The main unit is carried by the user via a strap. The strap has a fastening section which is secured to the main unit via a fastening element. The fastening section is held between a pressure surface of the fastening element and a fastening surface formed on the main unit. To prevent twisting of the strap when the fastening element is secured, provision is made for the fastening surface to be formed with a structure that increases the friction coefficient. The structure interacts with a bearing surface, facing the fastening surface, of the fastening section such that the fastening section, which is held in a clamped manner between the pressure surface of the fastening element and the fastening surface of the main unit, is prevented from rotating relative to the main unit.

16 Claims, 6 Drawing Sheets

PORTABLE WORK APPARATUS HAVING STRAPS

CROSS REFERENCE TO RELATED APPLICATION

This application claims priority of German patent application no. 10 2012 021 000.0, filed Oct. 26, 2012, the entire content of which is incorporated herein by reference.

FIELD OF THE INVENTION

The invention relates to a portable work apparatus which includes a main unit, carried by the user at least via a strap, and a work tool.

BACKGROUND OF THE INVENTION

U.S. Pat. No. 7,309,028 discloses a backpack-type blowing apparatus, the main unit of which is intended to be carried on the back of a user via straps. The work tool is formed by the blower tube, which is connected via a flexible connection to the work apparatus carried on the back and is guided by the user.

DE 196 16 764 C2 discloses a further work apparatus which includes a drive unit carried on the back and a work tool connected to the drive unit via a flexible shaft. The drive unit is carried as main unit on the back of a user, for which purpose the main unit is provided with flexible straps.

Portable work apparatuses in the context of the invention are also understood to include handheld blowing apparatuses which are additionally carried via a strap which is worn over the shoulder of a user.

When the strap is fastened to the main unit, the strap is intended to be secured in an orientation required for subsequent use; when the strap is screwed to a back panel of the main unit, unintended changes in position of the strap relative to the main unit frequently occur in practice. These changes in position have to be corrected in a time-consuming manner.

SUMMARY OF THE INVENTION

It is an object of the invention, in the case of a portable work apparatus of the type described above, to provide a fastening for a strap which enables a carrying strap to be easily secured to the main unit in a correct position.

The portable work apparatus of the invention includes: a strap having at least one fastening section; a main unit configured to be carried by an operator via the strap; a fastening surface incorporated in the main unit; a work tool; a fastening element having a pressure surface; the strap being configured fixed to the main unit via the fastening element in such a manner that the fastening section of the strap is held between the pressure surface of the fastening element and the fastening surface of the main unit; the fastening section of the strap having a bearing surface which faces the fastening surface; the fastening section of the strap being configured to be held clamped between the pressure surface of the fastening element and the fastening surface of the main unit in a clamped position; and, the fastening surface having a friction increasing structure formed thereon to coact with the bearing surface of the fastening section in such a manner that a rotational movement of the fastening section relative to the main unit is prevented when the fastening section is clamped into the clamped position.

A fastening section of the strap to be secured to the main body is held between a pressure surface of a fastening element and a fastening surface formed on the main unit. The fastening surface is formed with a structure that increases the friction coefficient. The fastening section of the strap has a bearing surface which faces the fastening surface formed on the main unit. The structure coacts with the bearing surface of the fastening section of the strap such that a rotational movement of the fastening section and thus of the strap relative to the main unit is prevented.

As a result of the friction coefficient increasing structure, it is ensured that the fastening section, arranged on the main unit in an oriented position, of the strap cannot slip in an arbitrary fashion relative to the main unit because the structure of the fastening surface and the strap enter into operative connection with one another. If, for example, a fastening section of the strap is secured by screws, the structure engaging into the material of the fastening section of the strap prevents the fastening section of the strap being carried along in the screwing direction of the fastening element, and so the orientation of the strap does not change during securing and corrections to the strap position can be dispensed with.

The structure increases the bearing surface area of the fastening section on the main unit. As a result, the force distribution is improved.

In a particular embodiment of the invention, the structure is configured such that it pushes into the material of the fastening section of the strap, in particular engages in the material of the fastening section of the strap. As a result, a virtually form-fitting connection in the screwing direction of the fastening element is achieved between the structure of the fastening surface and the strap section to be secured.

The structure expediently is made of individual elevations, wherein each elevation protrudes from the fastening surface. Advantageously, the individual elevations are located in a manner spaced apart from one another, and are thus elevations that are separated from one another. In this case, it is advantageous for the longitudinal center axis of an individual elevation to be approximately perpendicular to the fastening surface.

In an embodiment of the invention, the free end of an individual, preferably cylindrical elevation is formed in a pointed manner, such that an elevation has an approximately conical or thorn-like shape. This three-dimensional shape of an elevation ensures easy penetration into the material of the strap, so that as a result of simple holding of the strap during mounting, initial engagement between the structure and the material of the strap is already achieved. The conical, thorn-like configuration of an elevation furthermore has the advantage that the elevation itself is mechanically stable and, in the case of a strap consisting of fabric, the elevations pass between the warp and weft threads, that is, merely displace and do not destroy the threads of the fabric.

In order to achieve a form-fitting engagement, in the manner of an interlocking, of the elevations into the material of the fastening section of the strap, provision is made for the elevations to penetrate into the material of the strap, in which case it may be expedient for the free ends of the elevations to be deformed by the pressure surface of the fastening element.

The structure is formed from a plurality of individual elevations which are expediently arranged in a circular ring around a central fastening opening. In this case, it may be practical for the elevations of a first circular ring having a first diameter to be located in the region of the gaps between the elevations of a second circular ring having a second diameter.

When seen in plan view onto the fastening surface of the main unit, the size of the pressure surface of the fastening element corresponds approximately to the size of the fastening surface on the main unit. If the fastening surface is formed by a base of a countersink, the countersink is formed with a diameter slightly larger than the outside diameter of the pressure surface of the fastening element.

In order to keep the driving forces that act on the fastening section of the strap during securing as low as possible when the fastening element is being mounted, provision is made for the pressure surface of the fastening element to be formed in a smooth manner, in particular a planar manner. As a result, low friction is ensured between the fastening element and the strap.

The structure formed on the fastening surface is in particular made of plastics material, and in particular the elevations are formed in one piece with the housing of the main unit, wherein the housing is made of plastic. In this case, the main unit and the fastening surface having the structure can be produced in a single operation.

Advantageously, the fastening element is a clamping piece which is secured to the housing unit and spans the fastening section of the strap; expediently, the fastening element penetrates through the fastening section of the strap, producing a form-fitting fixation. In particular, the fastening section of the strap can also be fixed by one or more fastening screws screwed into the main unit adjacent to the strap, wherein a pressure surface of the fastening screw engages over the edge of the fastening section and pushes the fastening section of the strap onto the structure. In this case, it can be advantageous for the fastening screws to act on a clamping piece which spans the fastening section of the strap and presses the latter against the structure of the fastening surface.

The fastening element is in particular a screw which engages by way of a thread into the material of the main unit. The screw can be locked by a nut.

In order to secure the fastening section of the strap to the main unit, a different configuration of the fastening element can also be practical, for example a configuration as a rivet, clamping element or the like.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
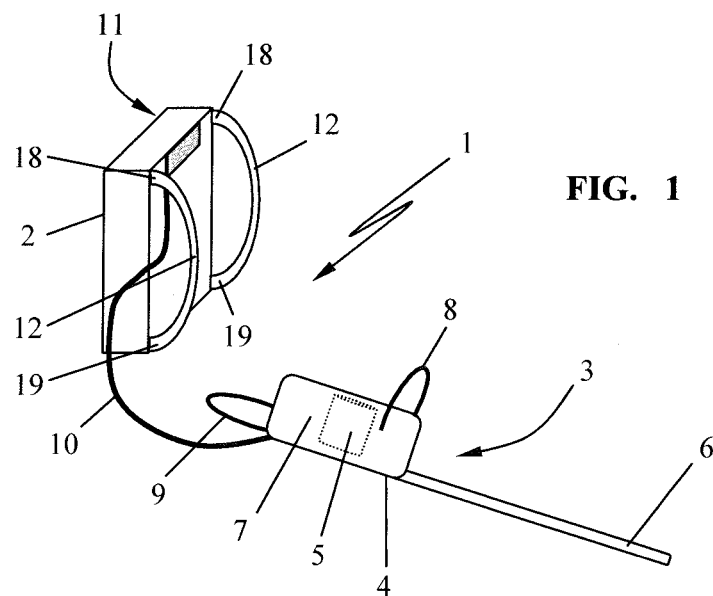
FIG. 1 is a schematic of a portable work apparatus, using the example of a battery-operated hedge trimmer.
Figure 2:
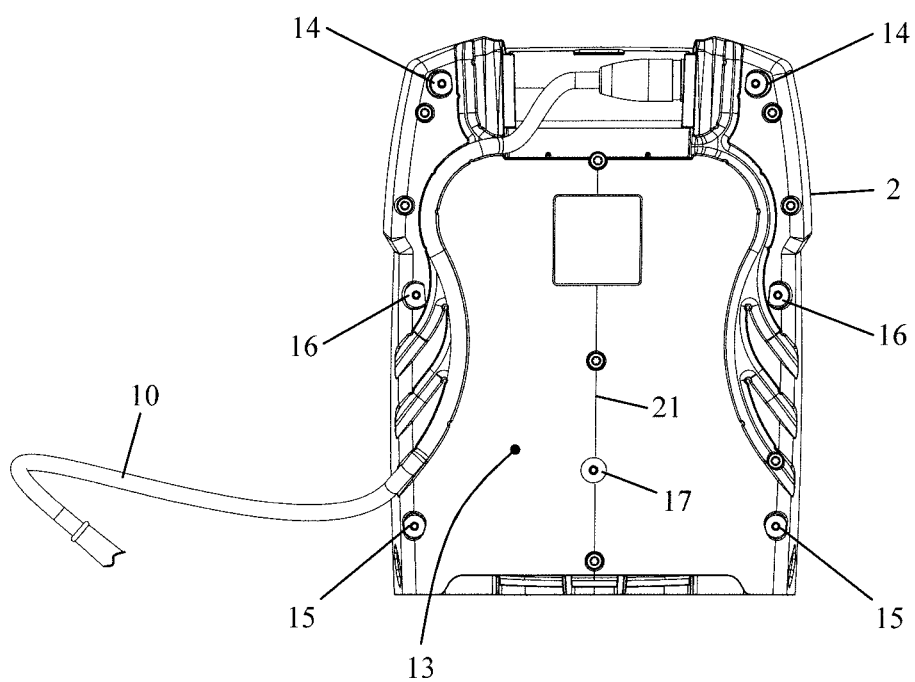
FIG. 2 is a view of the back panel of the main unit with an electric connection cable.

The work apparatus 1 shown in the exemplary embodiment substantially includes a main unit 2 and a work tool 3. In the embodiment shown, the work apparatus 1 is an electric hedge trimmer 4 having an electric drive motor 5 which is arranged at one end of a cutter bar 6. The cutter bar includes two reciprocating blades. The drive motor 5 is mounted in a housing 7 which has a front handle 8 and a rear handle 9 for holding and guiding the portable work tool 3. The work tool 3 guided by the user is connected to the main unit 2 via a flexible connection 10. In the case of the portable, electric work apparatus 1 shown in FIG. 1, the flexible connection 10 includes a flexible electrical cable which connects the battery packs, for example lithium-ion battery packs, accommodated in the main unit 2 to the electric drive motor 5 as electrical consumer.

The main unit 2 equipped with battery packs thus serves for supplying energy to the electric drive motor 5, wherein the main unit 2 is in the form of a backpack-type structural unit 11 which is secured to the back of a user by way of straps 12.

Figure 3:
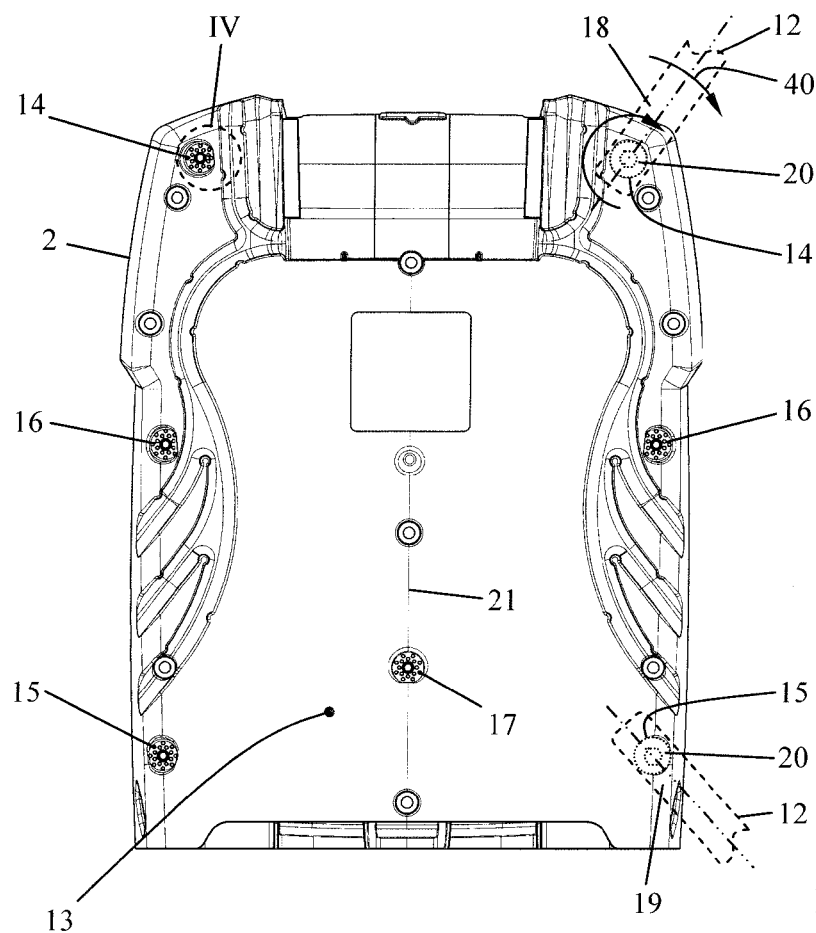
FIG. 3 is a view of the back panel of the main unit according to FIG. 2.

The back panel, facing the back of the user, of the main unit 2 has upper fastening surfaces 14 and lower fastening surfaces 15 to which—as illustrated in FIG. 3—the straps 12 are secured. In the embodiment, each strap 12 has an upper fastening section 18 and a lower fastening section 19 which are formed by the end sections of each strap 12 and are secured to the upper fastening surface 14 and the lower fastening surface 15, respectively. As illustrated in FIG. 3, the fastening sections (18, 19) are held on the main unit 2 by respective fastening elements 20.

In the embodiment shown, the back panel 13 of the main unit 2 has, in addition to the fastening surfaces 14 and 15, central fastening surfaces 16, wherein the fastening surfaces 14, 15 and 16 are arranged in a manner spaced apart from one another along a longitudinal edge of the main unit 2. In the embodiment according to FIG. 3, a fastening surface 17 located on the longitudinal center axis 21 of the main unit 2 is additionally provided and is located closer to the lower fastening surfaces 15 than the central fastening surfaces 16. The longitudinal edges of the back panel 13 extend in the direction of the longitudinal center axis 21, preferably approximately parallel to the longitudinal center axis 21.

Figure 4:
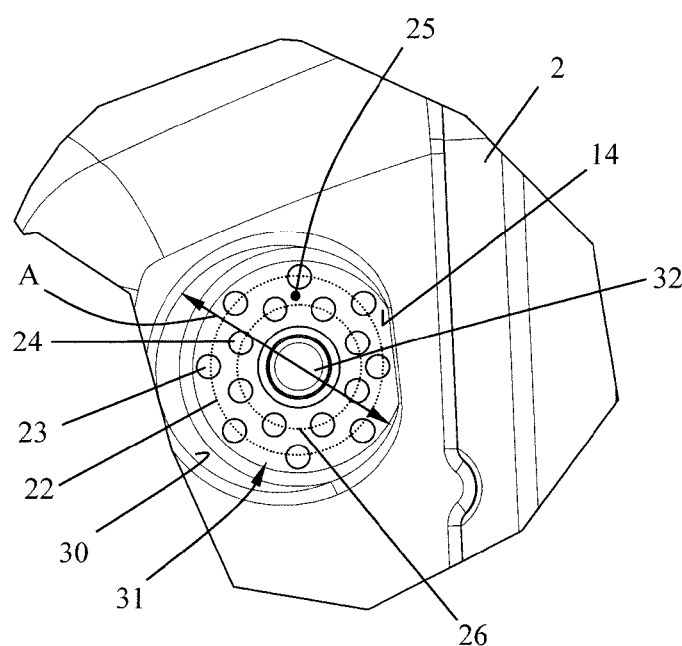
FIG. 4 is an enlarged view of the detail IV of FIG. 3.

As, in particular, the enlargement of the detail IV in FIG. 4 shows, a fastening surface is formed expediently by the bottom 31 of a countersink 30, wherein an opening 32 for the engagement of a fastening element 20 is formed in the center of the fastening surface 14, that is, in the center of the bottom 31.

Formed on the fastening surface 14, expediently on the bottom 31 of the countersink 30, is a structure 25 which increases the friction coefficient and is formed in the embodiment according to FIG. 4 by elevations 23 and 24 which protrude from the fastening surface 14. As the plan view according to FIG. 4 shows, the elevations 23 and 24 are located on respective circles 22 and 26, these circles 22 and 26 expediently extend in a concentric manner around the central opening 32. The number of elevations 23 in the outer circle 22 corresponds to the number of elevations 24 in the inner circle 26. In the embodiment shown, eight elevations are arranged in each circle (22, 26), wherein the elevations 24 of the inner, diametrically smaller circle 26 are located in the gaps between the elevations 23 of the diametrically larger circle 22. The height of the nub-like elevations 23 and 24 in the embodiment is less than the depth of the countersink 30.

Figure 5:
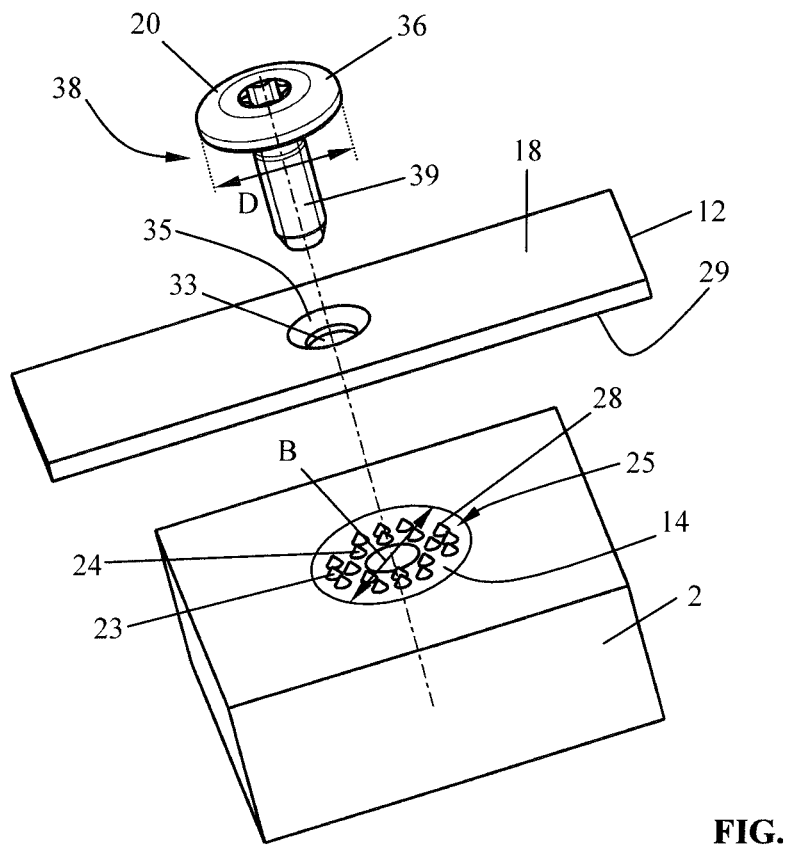
FIG. 5 is a schematic, perspective view of the fastening according to the invention.
Figure 6:
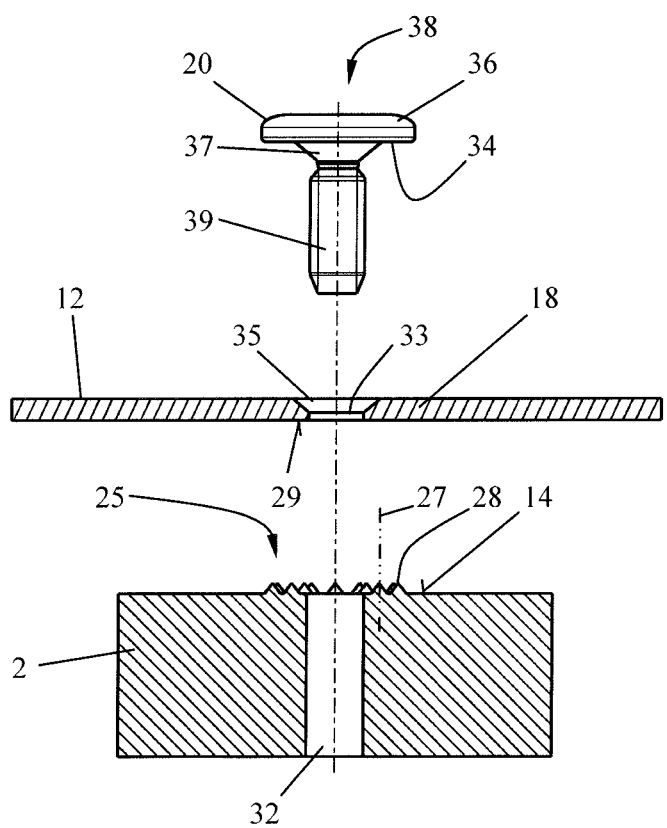
FIG. 6 is a section view through the schematic structure of a fastening of the invention according to FIG. 5.
Figure 7:
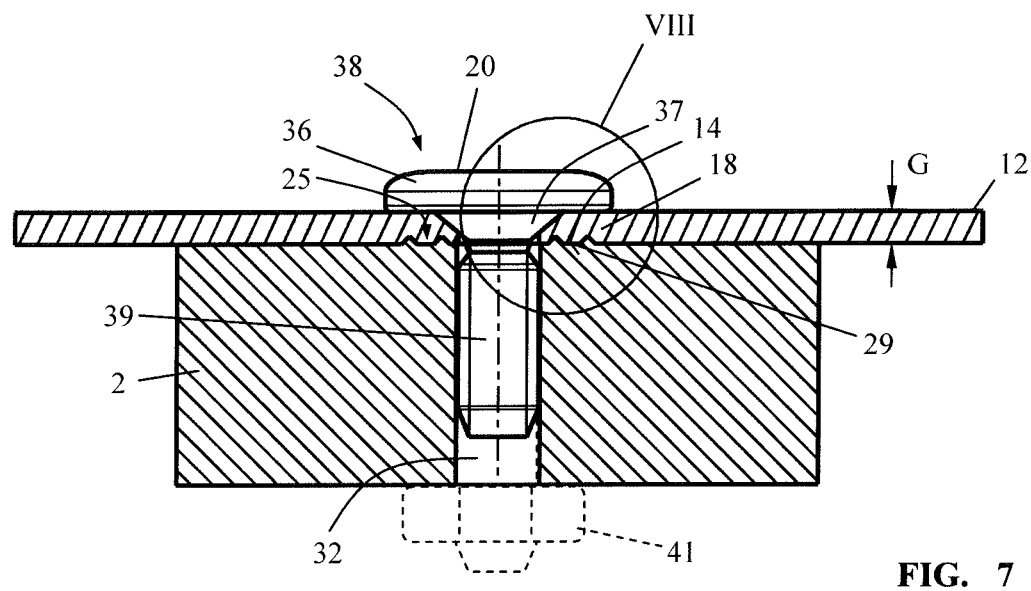
FIG. 7 is a section view through the fastening according to the invention according to FIG. 6 in the mounted state.

As is shown schematically in FIGS. 5 to 7, the fastening section 18 of a strap 12 is secured between a pressure surface 34 of the fastening element 20 and the fastening surface formed on the main unit 2. The structure 25, for example of the fastening surface 14, is expediently produced from the same material as the main unit 2, and in particular is formed integrally with the main unit 2. The structure 25 is a three-dimensional structure which protrudes from the fastening surface 14, wherein the longitudinal center axis 27 of an elevation is approximately perpendicular to the fastening surface 14 as shown in FIG. 6.

As can furthermore be seen from FIGS. 5 to 7, an elevation has a free end 28 which narrows, in particular is formed in a pointed manner such that an elevation (23, 24) has an approximately pointed-cone-shaped or thorn-like shape. Other forms of the elevations can also be advantageous, in particular the form of a pyramid, a sawtooth, a cone, a spike or the like.

In order to secure a fastening section 18 of a strap 12 to the main unit 2, a bearing surface 29 of the fastening section 18 is located facing the fastening surface 14. In the embodiment according to FIGS. 6 and 7, a fastening opening 33 for a fastening element 20 provided as a screw 38 is formed in the fastening section 18 of the strap 12. The fastening opening 33 has, at its end facing the screw head 36, a countersink 35 which interacts with a conical head section 37 of the screw 38. The fastening element 20 in the form of a screw 38 penetrates through the fastening section 18 of the strap 12 and is screwed by way of its threaded section 39 into the central opening 32 in the main unit 2. In this case, the fastening section 18 of the strap is clamped between the pressure surface 34 of the screw head 36 and the fastening surface 14 of the main unit 2. The three-dimensional structure 25 on the fastening surface 14 preferably penetrates into the material of the fastening section 18 of the strap 12, as is shown in FIG. 7 and in the enlarged detail VIII in FIG. 8.

If the fastening section 18 of a strap 12 is secured to the main unit 2 for example in an angular position oriented to the top right in FIG. 3, when the fastening element 20 is screwed tight in the clockwise direction, a driving torque is exerted via the pressure surface 34 onto the fastening section 18 of the strap 12. This driving torque acts in the direction of the arrow 40. Since, according to the invention, a structure 25 that increases the friction coefficient, in particular a three-dimensional structure 25, is provided on the fastening surface 14 and comes into engagement with the facing bearing surface 29 of the strap 12 when the fastening element 20 is tightened, the fastening section 18 of the strap 12 is prevented from being carried along in the clockwise direction (arrow 40). Thus, the fastening section 18 of the strap 12, the fastening section 18 being held in a clamped manner between the pressure surface 34 of the fastening element 20 and the fastening surface 14 of the main unit 2, is prevented from rotating in the arrow direction 40 relative to the main unit 2.

Since the three-dimensional structure of the elevations engages in the material of the fastening section 18, a kind of form fit is achieved between the main unit 2 and the fastening section 18 of the strap 12 in the direction of rotation (arrow 40). The form fit, even after mounting, reliably prevents a relative movement of the fastening section 18 of the strap 12 relative to the main unit 2. The fastening section 18 of the strap 12 is securely fixed in its mounted position on the main unit 2; it is also ensured during mounting itself that when the fastening element 20 in the form of a screw 38 is tightened, the fastening section 18 of the strap 12 is reliably prevented from being carried along in the direction of rotation of the screw 38. The mounting position selected by the user prior to screwing tight does not change when the screw 38 is tightened. The structure on the fastening surface 14 of the main unit 2 secures the oriented position of the fastening section 18 of the strap 12 both during mounting and during subsequent use of the portable work apparatus 1.

Figure 8:
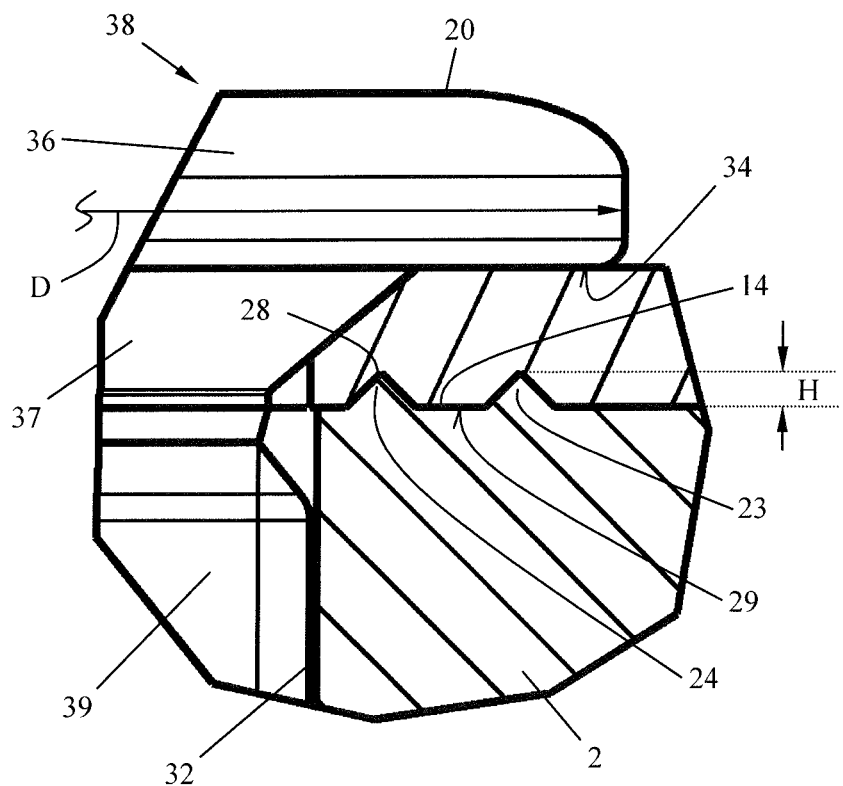
FIG. 8 is an enlarged view of the detail VIII in FIG. 7.

In the first embodiment shown in FIGS. 7 and 8, the height H of the elevations 23 and 24 is less than the thickness G of the fastening section 18 of the strap 12. In the embodiment shown according to FIG. 8, the height H of the elevations 23 and 24 corresponds to about 20% to 30% of the thickness G of the strap 12, in particular about 25% of the thickness G of the strap 12.

The strap 12 itself is formed advantageously by a fabric into which the elevations 23 and 24 dig when the screw 38 is tightened, and the elevations 23 and 24 thus penetrate into the material of the fastening section. As a result, a kind of form fit can be achieved—in the plane of the fastening section— between the main unit 2 and the fastening section 18 of the strap 12.

As can furthermore be seen in FIG. 8, the diameter B (FIG. 5) of the fastening surface 14 corresponds approximately to the outside diameter D of the screw head 36 or of the pressure surface 34. If, as shown in FIG. 4, a countersink 30 is formed, the inside diameter A of the countersink 30 is formed in particular in a slightly larger manner than the outside diameter D of the pressure surface 34 of the fastening element 20.

It is also clear from the enlarged view in FIG. 8 that the pressure surface 34 of the fastening element 20 is formed in a smooth manner, that is, is formed in a planar manner, in order that an only low friction coefficient is present between the material of the strap 12 and the pressure surface 34 when the fastening element 20 in the form of a screw 38 is tightened in the clockwise direction according to FIG. 3. As a result, only small adjustment forces acting in the arrow direction 40 act on the fastening section 18 of the strap 12 during tightening.

It can, as shown in FIG. 7, be practical to lock the fastening element 20 in the form of a screw 38 by way of a nut 41 in order to ensure that the strap 12 is fixed to the main unit 2 in a vibration-resistant manner. As a result, the stability can be increased and/or it is possible to dispense with a thread in the opening 32 of the main unit 2. The fixation of the fastening section 18 on the structure 25 of the fastening surface 14 can be ensured by a through-bolt.

In addition to a screw 38, it is also possible to provide a rivet, a clamping element or the like as fastening element 20.

Figure 9:
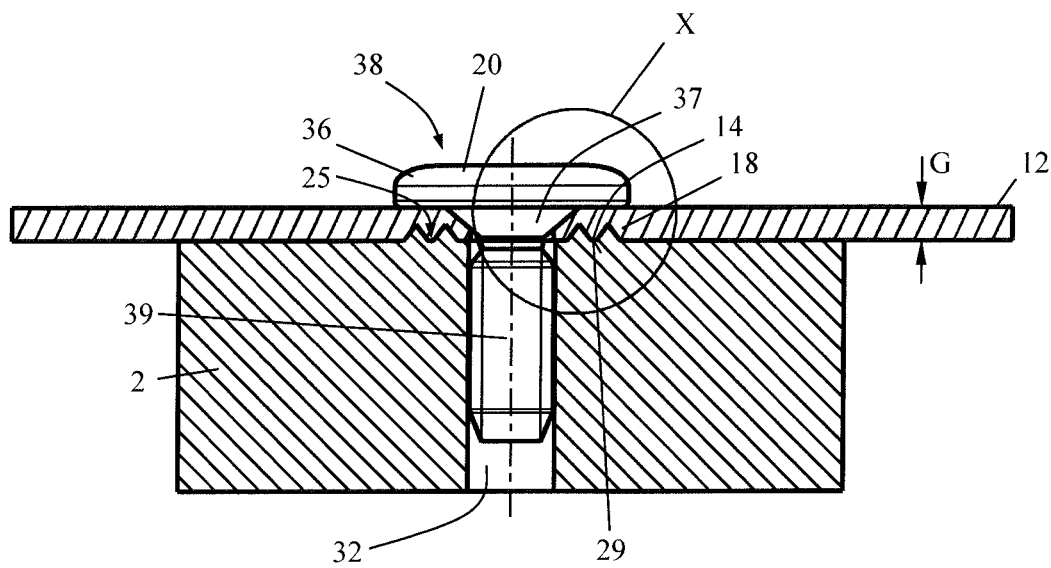
FIG. 9 is a section view through a further embodiment of the fastening of the invention according to FIG. 6.
Figure 10:
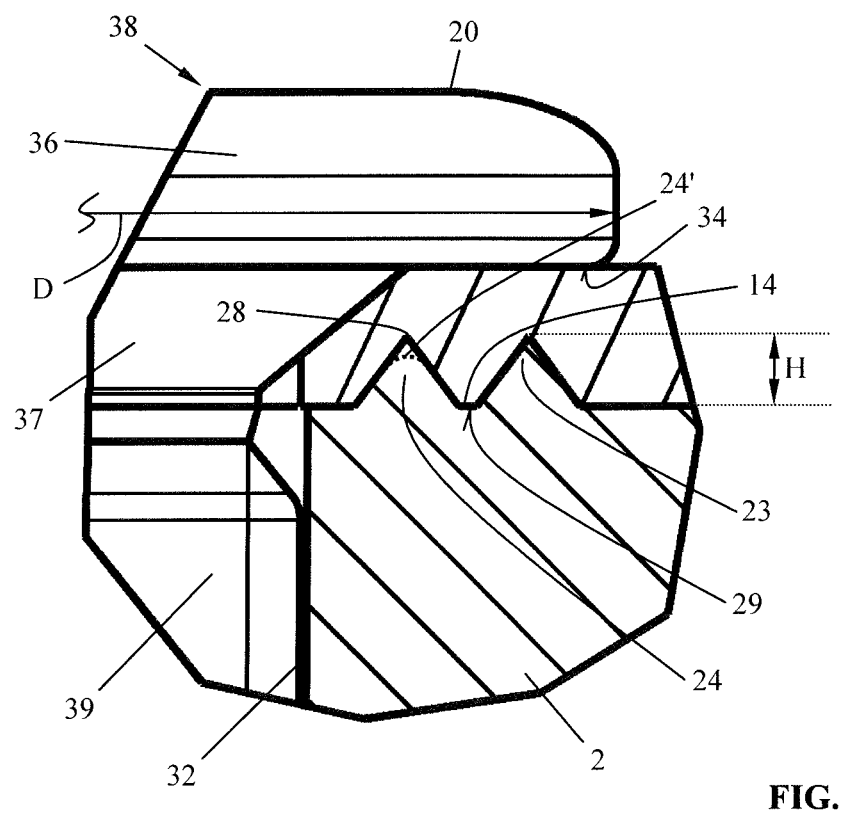
FIG. 10 is an enlarged view of the detail X of FIG. 9.

The basic structure of the embodiment according to FIGS. 9 and 10 corresponds to that of the embodiment according to FIGS. 7 and 8, for which reason identical reference signs have been used for identical parts.

In contrast to the embodiment according to FIGS. 7 and 8, in the embodiment according to FIGS. 9 and 10, the height H of the elevations (23, 24) is formed to be considerably larger as shown in FIG. 10; the height H corresponds to about 40% to 60% of the thickness G of the strap 12, in particular to 50% of the thickness G of the strap 12.

The elevations 23 and 24 on the fastening surface 14 penetrate deeply into the material of the strap 12 when the fastening element 20 in the form of a screw 38 is tightened, with the elevations 23 and 24 not destroying the material of the strap, but rather, for example in the case of a woven strap, displacing the warp and weft threads of a strap and penetrating into the gaps in the fabric. This ensures that weakening of the fastening section 18 of the strap 12 in the region of the screw head 36 is largely prevented, so that tearing out of the strap in the region of the fastening element 20 is counteracted, since the forces are distributed over a greater area.

Figure 11:
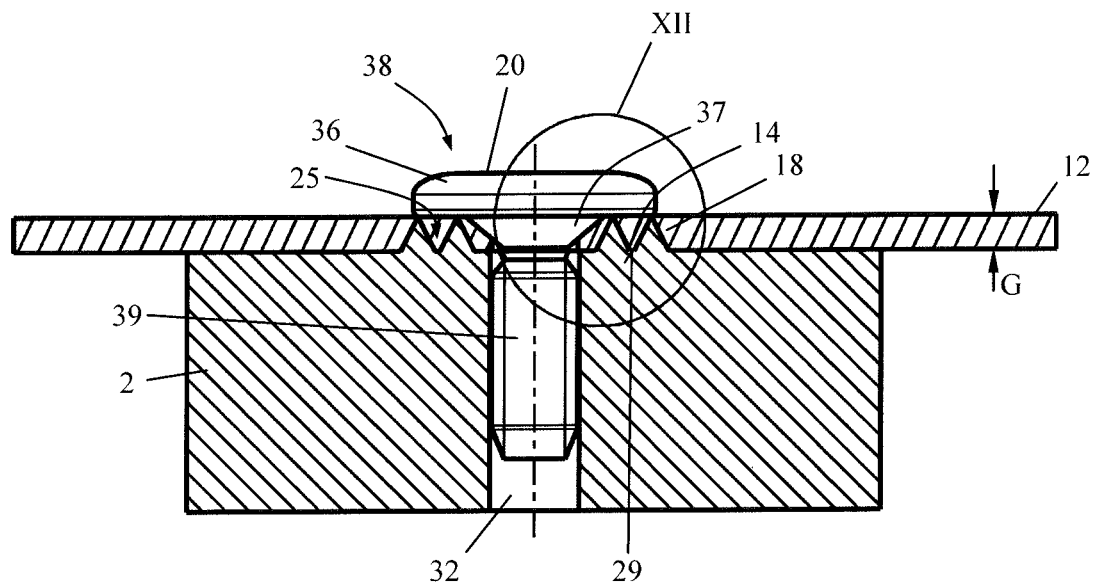
FIG. 11 is a section through a further embodiment of the fastening of the invention according to FIG. 6; and, FIG. 12 is an enlarged view of the detail XII of FIG. 11.
Figure 12:
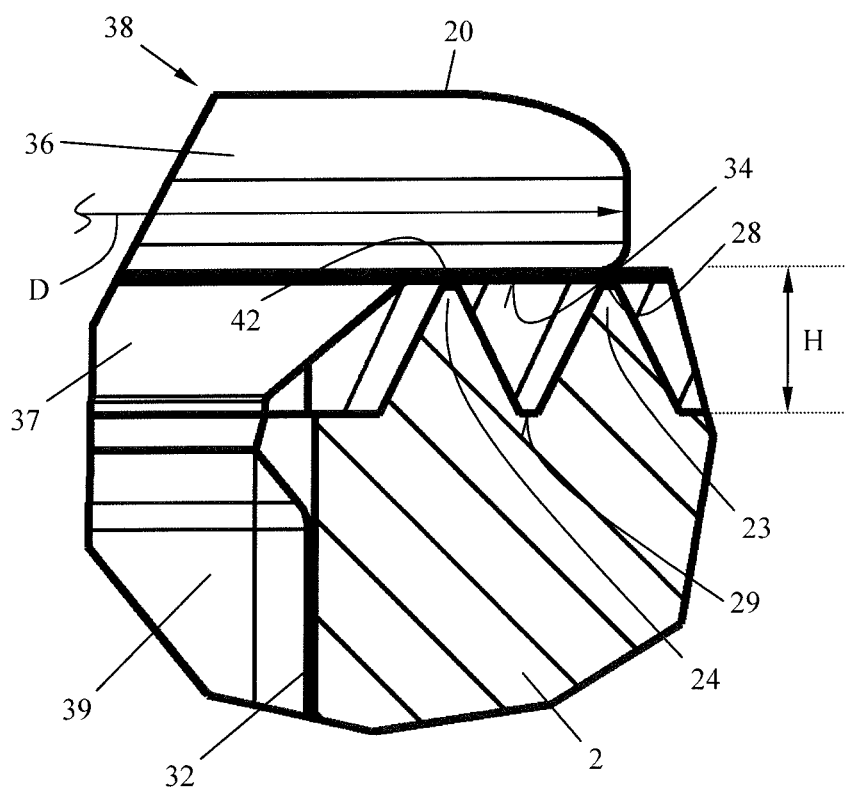

The basic structure of the embodiment according to FIGS. 11 and 12 corresponds to that of the embodiment according to FIGS. 7 and 8, for this reason identical reference signs have been used for identical parts.

In the embodiment according to FIGS. 11 and 12, the height H of the elevations 23 and 24 is selected to be approximately equal to, in particular slightly greater than, the thickness G of the strap 12. The height H of the elevations 23 and 24 can, for example, be 95% to 105% of the thickness G; expediently the height H corresponds to 100% of the thickness G of the strap 12.

If the fastening element 20 in the form of a screw 38 is screwed into the main unit 2, with the thread of the threaded section 39 engaging into the material of the main unit 2, the elevations 23 and 24 penetrate completely through the material of the strap 12 and rest against the pressure surface 34 of the screw head 36. When the screw 38 is tightened, the tips 42 of the free ends 28 of the elevations 23 and 24 are deformed, and are pressed flat in the embodiment shown in FIG. 12. The fastening forces of the screw 38 onto the fastening section 18 of the strap 12 are thus limited; the pressure surface 34 of the fastening element 20 sits on the three-dimensional structure 25 of the main unit 2.

In a further embodiment of the invention, provision can be made for the free end 28 of an elevation 24 to be rounded so that the elevation is in the form of a knob 24', as is indicated by dashed lines in FIG. 10. The knob 24' pushes by way of its rounded end 28 into the material of the fastening section 18 of the strap 12 without damaging the material; the material of the strap 12 is compressed or displaced by the knobs 24'. In this case, it may be practical for the elevation itself to be deformed. Such a configuration of a knob-shaped or stud-shaped elevation that pushes into the material of the strap 12 is advantageous for example in the case of plastics straps or leather straps.

It is understood that the foregoing description is that of the preferred embodiments of the invention and that various changes and modifications may be made thereto without departing from the spirit and scope of the invention as defined in the appended claims.

What is claimed is:

1. A portable work apparatus comprising:
   a strap having at least one fastening section;
   a main unit configured to be carried by an operator via said strap;
   a fastening surface incorporated in said main unit;
   a work tool;
   a fastening element having a pressure surface;
   said strap being fixed to said main unit via said fastening element in such a manner that said fastening section of said strap is held between said pressure surface of said fastening element and said fastening surface of said main unit;
   said fastening section of said strap having a bearing surface which faces said fastening surface;
   said fastening section of said strap being clamped between said pressure surface of said fastening element and said fastening surface of said main unit in a clamped position; and,
   said fastening surface having a friction increasing structure formed thereon coacting with said bearing surface of said fastening section of said strap so as to prevent a rotational movement of said fastening section relative to said main unit in said clamped position.

2. The work apparatus of claim 1, wherein:
   said fastening section of said strap is made of a material; and,
   said structure being configured to press into said material of said fastening section.

3. The work apparatus of claim 1, wherein said structure of said fastening surface is formed by a plurality of elevations which project from said fastening surface.

4. The work apparatus of claim 3, wherein each of said elevations define respective longitudinal center axes which are approximately perpendicular to said fastening surface.

5. The work apparatus of claim 3, wherein:
   said elevations include a first elevation having a free end; and,
   said free end being pointed such that said first elevation has a thorn-like shape.

6. The work apparatus of claim 3, wherein:
   said elevations include a first elevation;
   said fastening section of said strap is made of a material; and,
   said first elevation being configured to engage said material of said fastening section.

7. The work apparatus of claim 3, wherein:
   said elevations include a first elevation;
   said fastening section of said strap is made of a material; and,
   said first elevation being configured to penetrate through said material of said fastening section.

8. The work apparatus of claim 3, wherein:
   said elevations include a first elevation having a free end; and,
   said free end being configured to be deformed by said pressure surface of said fastening element.

9. The work apparatus of claim 3, wherein:
   said fastening surface defines a central fastening opening; and,
   at least a subset of said elevations are arranged in a circle around said central fastening opening.

10. The work apparatus of claim 3, wherein:
    said main unit has a housing made of plastic; and,
    said elevations and said housing are integrally formed as a one-piece component.

11. The work apparatus of claim 1, wherein said fastening surface as seen in a plan view has approximately the same size as said pressure surface of said fastening element.

12. The work apparatus of claim 1, wherein:
    said main unit has a countersink having a diameter A and a base;
    said fastening surface is formed by said base;
    said pressure surface has a diameter D; and,
    said diameter A is slightly greater than said diameter D.

13. The work apparatus of claim 1, wherein said pressure surface is smooth.

14. The work apparatus of claim 1, wherein said fastening element projects through said fastening section of said strap.

15. The work apparatus of claim 14, wherein said main unit is made of a material; and, said fastening element is a screw having a threaded section configured to engage in said material of said main unit.

16. The work apparatus of claim 14, wherein said fastening element is a rivet.

* * * * *